Oct. 12, 1965   T. F. MASON   3,211,202
POTATO PEELING AND CUTTING MACHINE
Filed March 26, 1962   4 Sheets-Sheet 1

INVENTOR.
THOMAS F. MASON
BY
Schapp & Hatch
ATTORNEYS

Oct. 12, 1965    T. F. MASON    3,211,202
POTATO PEELING AND CUTTING MACHINE
Filed March 26, 1962    4 Sheets-Sheet 2

INVENTOR.
THOMAS F. MASON
BY Schapp & Hatch
ATTORNEYS

Oct. 12, 1965

T. F. MASON 3,211,202

POTATO PEELING AND CUTTING MACHINE

Filed March 26, 1962

INVENTOR.
THOMAS F. MASON
BY Schapp & Hatch
ATTORNEYS

INVENTOR.
THOMAS F. MASON
BY
Schapp & Hatch
ATTORNEYS

United States Patent Office 3,211,202
Patented Oct. 12, 1965

3,211,202
POTATO PEELING AND CUTTING MACHINE
Thomas F. Mason, 127 San Rafael Way,
San Francisco, Calif.
Filed Mar. 26, 1962, Ser. No. 182,348
15 Claims. (Cl. 146—37)

The present invention relates to improvements in a potato peeling and cutting machine and particularly to improvements in a potato peeling machine in which the potato is moved relative to a peeling device so as to have the complete peel removed from the surface thereof.

A number of suitable potato peeling machines of the above character have been developed and are described in my United States Patents Nos. 2,489,581, 2,521,987 and 2,925,839. These machines have been very successful in removing the potato peel and simultaneously removing the eyes and rotten spots which appear on the surface of the potato. The present invention relates to such a machine which has certain improvements incorporated therein, and which also provides cutting devices which operate simultaneously with the peeling units in order to provide completely peeled and cut potatoes in a single operation.

Accordingly, the present apparatus is particularly suitable for use in restaurants or like places where potatoes should be peeled and cut quickly on demand, and yet where storage of peeled and/or cut raw potatoes is preferably minimized.

Although the present invention is especially suitable for peeling potatoes, it should be understood that certain other fruits or vegetables might be handled by the same machine without departing from the spirit or scope of the invention. For example certain hard vegetables such as carrots could be pared, cut and sliced using the present machine, if desired.

A particular advantage of the present invention resides in the fact that potatoes may not only be peeled whole, but may also be simultaneously peeled and cut into various of desired shapes and sizes. With suitable attachments, the machine can cut a potato in half or quarters, and form a plurality of slices, rings, shoestring or French fry forms, as well as more unusual geometric figures such as a serpentine.

It is a primary object of this invention to provide a machine of the character described in which potatoes are completely peeled and cut into any of a number of desired forms in a single operation with a minimum of waste.

Another object of the invention is to provide a potato peeling machine in which the potato is mounted for rotation and then rotated and axially moved against a peeling head resiliently mounted for cutting a continuous spiral peel from the surface of the potato while also removing eyes and soft spots.

A further object of the invention is to provide a potato peeling machine of the character described in which the potato is moved rotatably and axially through a cutter blade adapted to provide a spirally proceeding radial cut on the peeled potato and sever the same from the heel end in the chuck at the end of the peeling operation.

Still another object of the invention is to provide a potato peeling machine in which the potato is rotated and advanced through a peeling station by a chuck having means associated therewith for automatically ejecting the heel end of the potato after the cutting operation, which ejector is automatically reset for succeeding peeling operations.

Still another object of the invention is to provide a potato peeling machine of the character described in which the potato is rotated and axially advanced so as to be peeled by a peeling head and which is further advanced through a rotating cutter having a rotatable motion synchronized with the rotation of the potato so as to provide cuts substantially longitudinal to the potato.

Yet another object of the invention is to provide a potato peeling machine of the character described in which the potato is rotatably passed through a peeling station and in the same operation is both rotatably passed over a stationary blade and through a cutter rotating in synchronous motion with the potato so as to provide a peeling operation in combination with a multiplicity of cutting operations with a single movement of the potato.

A still further object of the invention is to provide a potato peeling machine of the character described in which the peeling is removed automatically to an area remote from the potato cuttings.

Further objects and advantages of my invention will be apparent as the specification progresses, and the new and useful features of my potato peeling and cutting machine will be fully defined in the claims attached hereto.

In its broad aspect, the potato peeling machine of this invention contains means for rotating a potato while simultaneously moving it along its axis of rotation past a peeler head resiliently held in cutting position against the outer surface of the potato so as to cut a continuous peel therefrom in spiral fashion. In general, the peeler head may be any of those described in my published United States patents cited above.

Such peeler heads are usually mounted on an arm or like means having a spring associated therewith for urging the peeler head toward the axis of rotation of the potato. In addition, the peeler head contains a pantagraph arrangement for positioning the peeling knife in proper cutting position regardless of changes in the contour of the potato being cut. There is also a nose piece associated with the peeling knife which cooperates therewith so as to position the peeling knife in cutting position to remove eyes and soft spots as well as the peel. The automatic positioning of the peeling knife and removal of the eyes and soft spots is accomplished by the peeling heads of my prior patents and further description may be found in such publications.

However, the present invention provides an improved peeling knife which contains means associated therewith for directing the peel outwardly from the potato and away from the machine. These means also contain a recess to prevent clogging of the peeling blade which might otherwise occur during the beginning of the peel operation.

The means for rotating and advancing the potato is designed for cooperation for the other machine components to provide an unitary processing result on the potato. Accordingly, this means generally contains a chuck for holding the potato and insuring rotation thereof, as well as axial movement together with means for holding the potato at the other end with or without rotation and free from axial movement thereof.

The chuck contains structures specifically adapted for the type of cutting operation to be performed on the potato. Thus when the potato peeler simultaneously peels and cuts the potato with the cut being radial to the potato, a heel of the potato is left on the chuck as it completes its axial movement and comes to a stop. In such a case, an automatic ejector is included with the chuck so that as the chuck is returned to position for receiving a new potato the heel of the potato is automatically ejected and the ejector mechanism automatically re-sets itself. On the other hand, when the potato is peeled and simultaneously passed through a cutter which is synchronized for rotation with the chuck to provide transverse cuts on the potato and no radial cutting blade is provided, the chuck is provided with recesses which conform with the cutting die so as to insure that the entire potato is passed therethrough.

Accordingly, it is seen that certain improvements have been incorporated into the machine to provide more rapid and efficient operation. However, the most important aspect of this invention resides in the combination of peeling and cutting that is achieved by the machine of this invention. In this connection, an important embodiment includes the synchronous rotation of the potato and the chuck carrying the same with a cutter adapted to provide an axially extending cut on the potato. This may be accomplished by receiving the rotational drive from the potato, or by an independent drive means synchronized with the chuck. These embodiments and advantages achieved thereby will be discussed more fully below where the preferred forms of the invention are described in detail.

The preferred forms of my invention are illustrated in the accompanying drawings forming part of this specification, in which:

FIGURE 7, a perspective view of another improved cutter which may be used with the peeling machine shown in FIGURE 1 for providing potatoes cut in a form suitable for making shoestring potatoes or the like;

While I have shown only the preferred forms of my invention, it should be understood that various changes or modifications may be made within the scope of the claims attached hereto without departing from the spirit of the invention.

Figure 1:
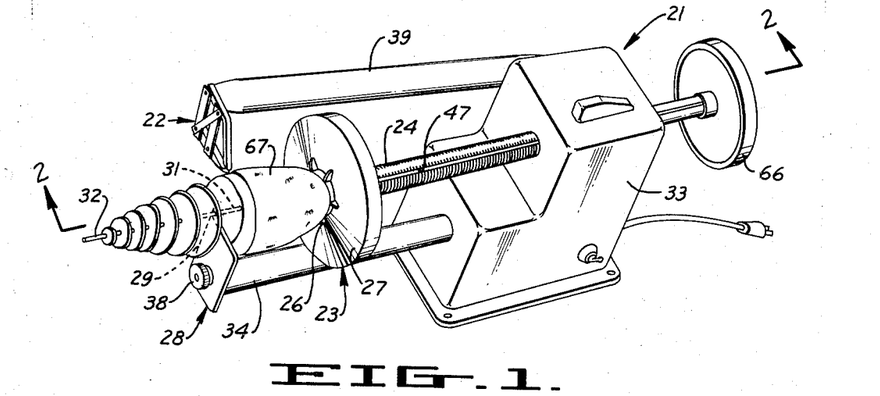
FIGURE 1 is a perspective view of a preferred form of the invention illustrating the embodiment which simultaneously peels and radially cuts the potato in spiral fashion.

Referring to the drawings in greater detail, there is shown in FIGURE 1 a potato peeling machine 21 capable of rotating and advancing a potato past a peeler head 22 so as to remove a peel from the potato in spiral fashion. As here shown, the potato is held by a chuck cam assembly 23 which is carried on a screw 24 and includes a chuck 26 and a cam surface 27. The chuck cam assembly and associated chuck serves to hold the potato at one end thereof and provide a rotational and axial movement to the potato so that the skin or peel thereof is presented spirally to the peeler head 22 which is resiliently held against the surface of the potato.

In general, the potato is also held at the end opposite the chuck with means permitting free rotation of the potato about the central axis of the chuck with the said means being in alignment with this central axis. Generally, this means is associated with and held by a unit adapted to provide additional cuts on the potato, although it is possible to include a simple spindle which merely holds the potato and allows it to be peeled whole. Alternatively, such a mechanism could contact one or more blades adapted to rotate with the potato so as to provide a radial cut on the whole potato or cut the potato in halves or quarters.

In the embodiment shown in FIGURES 1 through 8, the potato peeling machine has a cutting blade held in a position substantially perpendicular to the axis of rotation for providing a spirally advancing radial cut on the potato. As shown in FIGURE 1, the attachment 28 contains a cutting blade 29 as well as a spindle 31 on the chuck side of the cutting blade in alignment with said chuck for holding the potato. As here shown, attachment 28 also contains a self-unloading collecting pin 32 which is located on the side of the cutting blade 29 opposite to the chuck and in alignment with the spindle 31.

Figures 2, 3, 4, 5:
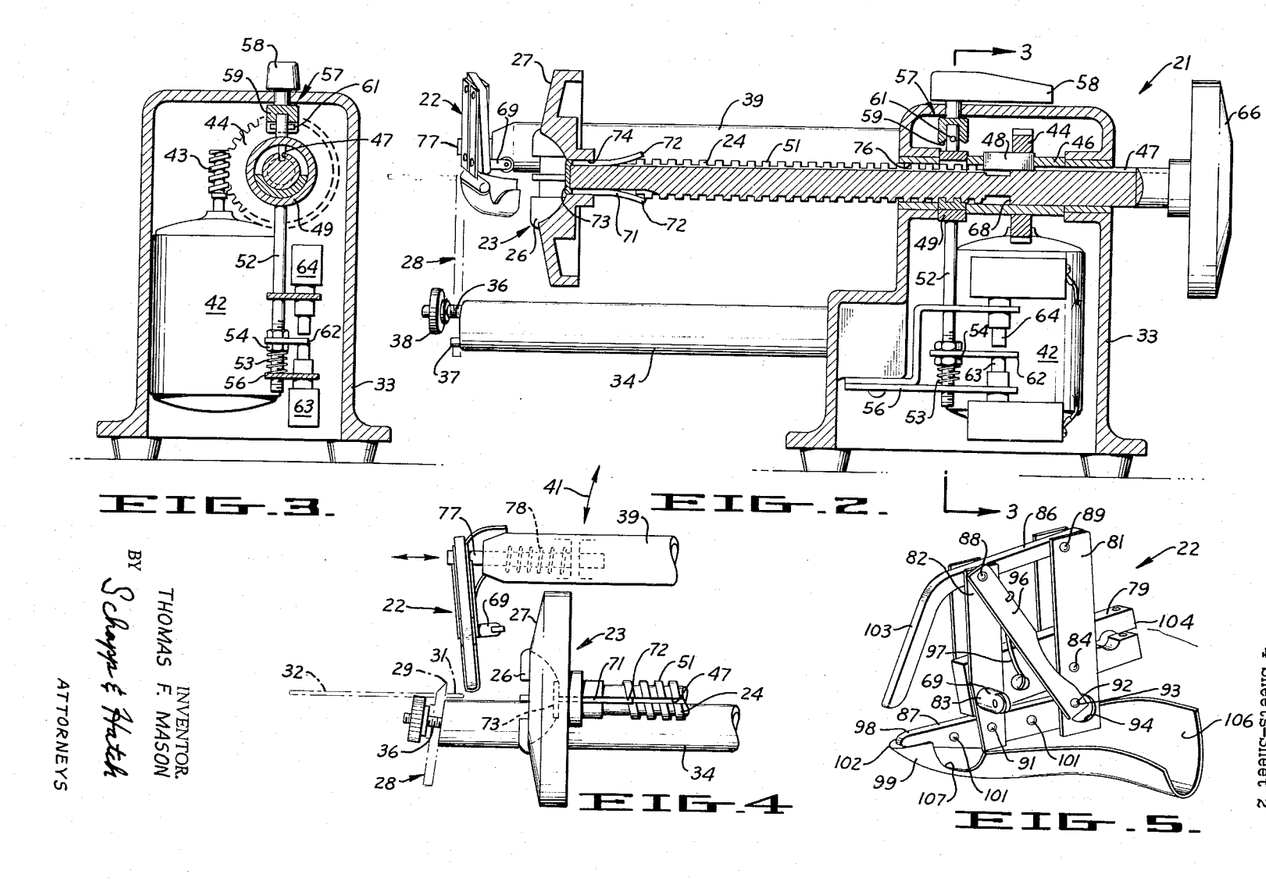
FIGURE 2, an elevational view of the apparatus shown in FIGURE 1 substantially as seen in the plane of line 2—2 thereof.
FIGURE 3, a cross-sectional view of the apparatus shown in FIGURE 1 taken substantially in the plane of line 3—3 of FIGURE 2.
FIGURE 4, an enlarged fragmentary view of a portion of FIGURE 1 illustrating more fully the relation of the chuck, peeler head and mounting therefor, and the radial cutting blade thereof.
FIGURE 5, a perspective view of the preferred peeler head utilized in all of the embodiments of this invention here shown and illustrating in detail an improved directing means for carrying the peel away from the machine while avoiding clogging of the peeling knife.

As shown more particularly in FIGURES 1 through 3, the cutting machine is carried in a housing 33 having a fixed arm 34 for holding attachment 28 or other similar types of attachments. As best seen in FIGURES 1 and 3, the attachment 28 or other suitable attachment is carried on threaded extension 36 of arm 34 and aligned by detent 37 so as to be in proper operative position on the machine. Easy change of attachments is accomplished through nut 38 which is knurled for easy removal and tightening. Thus it is seen that attachment 28 may be exchanged for attachment 28a, 28b, 28c or others simply by removing nut 38, removing the attachment, putting in the desired attachment which has aligned holes for fitting through threaded extension 36 and detent 37, and tightening nut 38 back in place. When clearance is required, spacer 30 is added, see FIGURE 6.

The peeling head 22 is held in proper position with respect to the axis of rotation of the potato by means of pivotal arm 39. Thus the arm 39 is free to pivot in the directions indicated by arrows 41 of FIGURE 4 by virtue of a pivotal mounting and a spring (not shown) which urges the arm against an adjustable limit position toward the axis of rotation of the potato. The resilient mounting is important to provide pressure of the peeler head against the potato and yet allow the arm a travel distance from near the axis of rotation of the potato to the extreme outside portions as peeling is accomplished.

As indicated above, screw 24 carries the chuck 26 and imparts rotary and axial movement to the chuck and thence to the potato. Rotary motion is applied to screw 24 from a suitable power source such as an electric motor 42 through a worm gear 43 (see FIGURE 3) and a gear 44. The gear 44 is mounted on a sleeve 46 which in turn is keyed to the screw 24 through a groove 47 and a key 48 which fits therein. Axial movement of screw 24 is obtained by the engagement of a split nut 49 with a screw thread 51 of screw 24.

As best seen in FIGURE 2, split nut 49 is carried on a rod 52 which causes the nut to engage threads 51 when rod 52 is elevated. Elevation of rod 52 is achieved by compression spring 53 which normally urges the rod upward by its spring pressure against a nut 54, which is carried on rod 52. A flange 56 is permanently secured to the housing and carries rod 52 for axial movement through an opening therein.

At the top of rod 52, there is a stop means 57 which holds rod 52 against compression spring 53. Split nut 49 may be disengaged from threads 51 by positioning rod 52 downwardly, and this may be accomplished by rotation of the handle 58 which engages cam surfaces 59 of stop means 57 with an end 61.

Rod 52 also carries a switch actuating lever 62 which contains an off-switch 63 which is actuated when rod 52 is urged downwardly, and which contains off-switch 64 which is actuated when rod 52 is in the upward position. When the rod 52 is in an intermediate position, the motor is on and the split nut drives screw 24.

The operation of the chuck cam assembly and associated drive means goes through the following steps in sequence. The handle 58 is turned to depress rod 52 downward thereby disengaging the split nut and actuating the off-switch. Screw 24 is then pulled axially away from the peeler head by means of a handle 66. A potato 67 is pushed into the chuck 26 at one end thereof as shown in FIGURE 1, and then screw 24 is axially advanced by the operator so as to engage the potato with spindle 31 carried on attachment 28. This movement is done by hand with the operator holding the potato in proper alignment with one hand while pushing screw 24 axially with the other hand at handle 66.

With the potato thus positioned, the peeling head is also automatically in peeling position so that peeling and cutting may be effected. To do this, the operator simply turns handle 58 so as to allow rod 52 to be forced upwardly with the resultant engagement of split nut 49 and positioning of lever 62 between off-switches 63 and 64. The actuated motor then rotates screw 24 while the split nut causes it to move axially. In this way the potato moves axially through cutting blade 29 of attachment 28 while the peeling head 22 cuts a spiral peel from the potato as best seen in FIGURE 1. With the attachment 28 the potato is peeled and simultaneously cut into a serpentine configuration.

When the chuck approaches the peeler head 22 toward the end of the peeling operation, the split nut 49 comes to the end of thread 51 and rides in a cutaway 68. This causes axial movement of the potato to cease and prevents the chuck from hitting cutting blade 29 of attachment 28.

At the same time, the cam surface 27 of chuck cam assembly 23 contacts a cam follower 69 so as to prevent contact of chuck 26 with the peeler head 22. In addition, this cam surface positions the peeling knife of peeler head 22 in an axial position that guarantees peeling the last slice going through cutting blade 29 regardless of the diameter of the potato at this point.

When the split nut moves into cutaway 68, it also brings lever 62 into contact with off-switch 64 so as to shut-off the rotation of screw 24. However, this rotation continues for a time sufficient to allow cutting blade 29 to make a circular cut and sever the serpentine or other cut form from the heel of the potato.

With the peeling and cutting thus accomplished, the operator turns handle 58 so as to depress rod 52 down into and in engagement with off-switch 63 and lower the split nut 49. The operator then brings the chuck cam assembly back against the housing by pulling on handle 66, and this movement automatically ejects the heel of the potato from the chuck by means of an ejector pin 71. As best seen in FIGURE 2, ejector pin 71 contacts the housing with its points 72 and moves a member 73 thereof axially against the potato to push the potato off the chuck.

As a feature of the invention, the ejector is automatically re-set by virtue of the fact that points 72 of pin 71 are forced together after they eject the heel of the potato by walls 74 in chuck 26 and thence move into the housing at 76. In this way the ejector is free to move axially so as to allow a new potato to be immediately positioned on the chuck.

As indicated above, the peeling head 22 may vary somewhat in design but should be of a type that will remove all of the peel together with all of the eyes and soft spots. Peeling head 22 is attached at the end of arm 39 on rod 77 which is journaled for axial movement at the end of the arm. Compression spring 78 then holds rod 77 and peeler head 22 mounted thereon in proper position against the arm 39 while allowing the peeler head to move axially outwardly against spring 78 when the chuck cam assembly makes contact as explained above.

The preferred peeler head 22 is shown in detail in FIGURE 5. It comprises the central bar 79, a pair of levers 81 and 82 pivoted thereto in spaced relation, as at 83 and 84, and a pair of links 86 and 87 pivoted to the ends of the levers, as at 88, 89, 91 and 92, so as to form a parallelogram therewith.

As shown herein, the pivot at 92 is effected through a pivot pin 93 which is free to move over a limited distance in a hole 94 of lever 81. However, the pivot pin 93 is journaled in a diagonal link 96 for rotational movement only so that link 87 is held in proper position thereby. Diagonal link 96 is also pivoted at 88, and resiliently positions pivot pin 93 in hole 94 by means of leaf spring 97. The link 87 has a nose 98 extending beyond the lever 82 and adapted to ride on the surface of the potato while in operative position. Preferably, the nose is rounded and say about ¼″ in width.

The link 87 also has a peeling knife 99 in the form of a chute secured thereto by screws 101. This peeling knife projects forwardly from the link 87 about the nose thereof and contains a semicircular knife edge 102 slightly ahead of the nose 98 and disposed on a forward incline, as shown, so as to cut a thin slice from the circumference of a rotating potato when the nose is pressured thereon. The link 86 carries a pilot member 103 which extends in a sweeping curve toward the nose and is also adapted to ride on the rotating potato. The purpose of this pilot is to guide the peeling knife 99 into proper cutting position with respect to the potato surface.

It will be noted that the spring 97 and the diagonal link 96 naturally hold the assembly in the position shown. The central bar 79 is secured on rod 77 of pivotal arm 39 by means of a screw (not shown) adapted to urge the members of bifurcated end 104 of central bar 79 relatively together. In this way, the peeling head 22 is secured in place at the proper angle.

As indicated above, pivotal arm 39 carries a spring or equivalent means for urging it toward the axis of rotation of the potato and this force is greater than that exerted by leaf spring 97. Thus the nose 98 is continuously held against the potato while the machine is in operation.

During a normal peeling operation, the peeling head will ride over the surface substantially in the position shown in FIGURE 5. However, the pilot member may be crowded back slightly, depending on the contour of the potato and such crowding advances a knife edge while the nose is in sliding contact. The distance between the knife edge and the nose determines the depth of the cut, and this depth remains constant for all tilts of the knife.

As an eye in the potato passes the peeling head, the nose follows the contour of the eye cavity under the pressure exerted by arm 39. However, the pilot member on striking the far edge of the eye is forced backwardly in hole 94 thereby adjusting the tilt on link 87. In this way, the change of tilt of link 87 causes the peeling knife to advance into the eye in proportion to the depth of the eye for entirely removing the same.

It will be noted, in this connection, that the linkage shown favors the pilot member over the blade member, so that the pilot member will readily retract against the pressure of spring 97 to advance the peeling blade into the eye cavity. On the other hand, after the eye has been removed and the extra pressure has been relieved, the spring 97 will readily urge the blade back to normal position.

The width of the nose in relation to the resilient pressure under which it is urged against the potato is such that the nose will ride on a firm potato without digging into it. However, the width and pressure is sufficient to push the nose into any soft or rotten spot in the potato. When it penetrates into any soft spot, the pilot is positioned back and the blade is moved forward, so as to cause the latter to cut out the bad spot.

When a potato is peeled and cut according to the invention, it has been found desirable to provide means for conveying the peel away from the vicinity where it is formed so as to prevent the peeling from falling into the receiving area for the finished potato. This is particularly true where the finished potato has been cut into a large number of small pieces. Accordingly, the peeling knife 99 has means associated therewith for directing the peel outwardly from the potato and away from the machine. As shown in FIGURE 5, the typical means comprises a trough 106 which extends rearwardly from the knife edge 102 and laterally away from the area of the finished potato.

Another problem which has been encountered in connection with the removal of the peel is a tendency of the trough to cause clogging of the knife at the beginning of the peel operation when the peeling knife is cutting at the end of the potato. In such a cutting position, the peel comes off the potato by virtue of peeling at the side of the knife and tends to form a spiral peel at the beginning of the trough.

As a general rule, this spiral peel is short and simply precedes the main peel moving normally down the trough which follows later as the peeling knife moves outwardly on the potato and peels normally near its end. In such cases, no problem is encountered. Nevertheless the situation will sometimes be encountered where an excessive amount of spiral peel may build up near the knife edge before sufficient forces are created to push it outwardly down the trough so as to clog the peeling knife unless means are taken to prevent such clogging. Accordingly, the means for directing the peel outwardly from the potato also contains a recess 107 whereby any sideways spiral peel is removed from the peeling knife to prevent clogging thereof.

In the embodiment shown in FIGURES 1 through 4, the potato is simultaneously peeled and spirally cut by a single blade disposed perpendicular to the axis of the rotation of the potato and thereby producing a radial cut. However, other cutting blades could be used alone or in combination with this perpendicular cutting blade 29. For example, the attachment 28 could include a cutting blade 29 having cutting elements perpendicularly disposed to the cutting blade at spaced distances for producing circular cuts in the spiral slices obtained. With such an arrangement, a series of concentric spiral rings are obtained from each potato.

Figure 6:
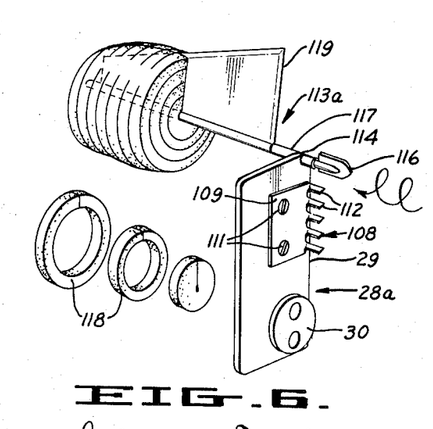
FIGURE 6, a perspective view of an improved cutting attachment which may be used on the machine of FIGURE 1 so as to provide a plurality of potato rings.

A preferred unit for providing such rings is found on attachment 28a of FIGURE 6 wherein a cutting element 108 is provided. As shown in FIGURE 6, the cutting element 108 is fastened to attachment 28a and could be attached to cutting attachment 28 of FIGURE 1 if desired. Cutting element 108 consists of a flat plate 109 adapted to be fastened to the cutting blade 29 by screws 111 or other attaching means and contains a series of blade elements 112 disposed in planes which are perpendicular to both the cutting edge of cutting blade 29 and the plane of flat plate 109. Preferably the blade elements 112 are made integral with flat plate 109 and bent into position. This construction provides easy fabrication and a long operating life. Alternatively the same cutting action may be achieved by a series of pins appropriately secured to the attachment 28 or other equivalent cutting means.

Other variations could include the omission of collecting pin 32 or the omission of cutting blade 29. However, the machine of this invention is particularly valuable where the potato is peeled and cut simultaneously. A particular advantage of the form shown resides in the fact that the collecting pin is self-unloading at its end, while crescents or incomplete rings drop off as they are formed.

An important embodiment of this invention relates to a machine which includes cutters capable of producing units which are longitudinal or axially directed to the potato. These longitudinal cuts may be accomplished alone and the embodiment described in FIGURES 9 through 15 is particularly applicable for such situations, or it may be desired to provide the axially extending cuts in combination with the radial and/or circumferential cuts described above in connection with the units disclosed in FIGURES 1 through 5.

In order to provide axially extending cuts with the machine of this invention, means are provided for rotating a cutter in synchronous rotation with the chuck. These means may be constructed in a number of ways and the embodiments here shown illustrate two suitable systems.

Figure 7:
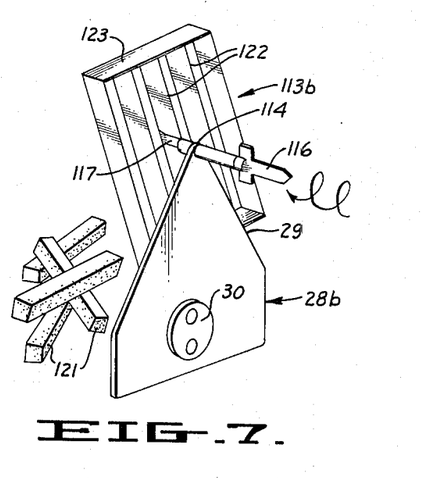
Figure 8:
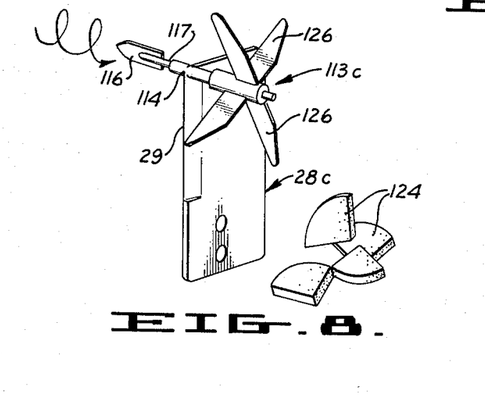
FIGURE 8, a perspective view of still another form of the preferred cutters that may be used with the machine of FIGURE 1, and which provides potato slices directly during the peeling operation.

One of these systems involves a cutter having a gripping means thereon for holding the end of the potato opposite the chuck in alignment with the chuck while also transferring the rotational motion of the potato to the cutter which is journaled for rotation. Typical examples are shown in FIGURES 6 through 8, in which cutters 113a, 113b and 113c are shown on attachments 28a, 28b and 28c respectively. Each of the cutters 113a, 113b and 113c are journaled for rotation on the corresponding attachment 28a, 28b and 28c at 114 adjacent to cutting blade 29. Each cutter also contains gripping means 116 which are in the form of a spade, as shown, or any other configuration adapted to translate the rotational movement of the potato to the cutter.

As shown in FIGURES 6 through 8, each of the cutters 113a, 113b and 113c has a specific configuration of cutter elements carried on a shaft 117 directly behind the blade 29. Thus in these embodiments, the potato is subjected to a spiral cut shown in FIGURE 1 together with additional cuts depending upon the attachment.

In FIGURE 6, the cutter 28a is adapted to cut a series of concentric split rings 118 as shown. The radial cut is achieved by cutting blade 29 and the circumferential cuts which form rings therefrom are achieved by blade elements 112. The axially extending cutter which cuts the spiral to form the rings comprises cutting blade 119 which is carried on shaft 117 and rotates in synchronous motion with the potato. As here shown, cutting blade 119 is elongated in the axial direction so as to also serve as a holding element for the rings as they are formed.

In FIGURE 7, attachment 28b is illustrated which attachment provides the radial cut proceeding in spiral fashion as shown in FIGURE 1, in combination with a series of substantially parallel transverse cuts which tend to cut the potato in slab form with the slabs being parallel to the axis of rotation. Thus the attachment 28b provides potato pieces or squares of rectangular cross-section which extend transversely across the potato to provide the potato piece 121. These pieces are suitable for cooking into shoestring potatoes, French fried potatoes, or the like. The cuts which extend transversely across the potato and along the length thereof parallel to the axis of rotation are provided by the plurality of blades 122 disposed substantially parallel to each other and held by frame 123 as shown in FIGURE 7.

In FIGURE 8, there is shown an attachment containing cutter 113c which is adapted to provide axially extending cuts which cut the potato into quarters. This cutting action combines with the action of cutting blade 29 to provide the quarter slices 124. Cutter 113c is carried on attachment 28c at 114 where it is journaled for rotation which rotation is received from the potato through gripping means 116. The cutter contains a pair of blades 126 which are disposed perpendicular to the axis of rotation of the potato and perpendicular to each other.

It is seen from FIGURE 8, that half slices of potatoes can be obtained by utilizing a single blade 126 instead of the pair shown, and that the single blade would serve to cut the potato in half and that the spiral cut achieved by blade 29 would be severed to provide half slices of potato. Similarly, whole slices may be provided simply by utilizing a single half blade or a cutter blade similar to cutting blade 119 of FIGURE 6. With this arrangement, the radial cut severs the spiral or serpentine made by cutting blade 119 so as to provide whole slices, each having a radial cut therein.

Obviously, other combinations of the basic cutting elements disclosed in the drawing could be used. For example, cutting element 108 could be added to the unit shown in FIGURE 8, if desired, so as to produce quarter rings. Thus it is seen, that my machine is capable of simultaneously peeling and cutting potatoes into any of a variety of desired shapes. It is also seen that most any cutting operation may be achieved by simple modification and/or combination of any of the cutting blades here shown.

While the cutting attachment 28b shown in FIGURE 7 is suitable for providing potatoes in a French fry or shoestring form, the length dimension of the resulting pieces of potato 121 correspond to the cross-wise dimension of the potato. It is often desirable instead to provide French fry forms which are as long as possible and therefore have the length corresponding with the long axis of the potato. The embodiment shown in FIGURES 9 through 15 illustrates a potato peeling machine 21a particularly suitable for providing such cuts.

The potato peeling machine 21a utilizes a cutter which rotates in synchronous rotation to the potato being peeled and which provides axially extending cuts on the potato after the same has been peeled by the peeler head 22. This synchronous motion is achieved by a gearing system which provides a direct drive relation with the chuck rotating the potato and the cutter providing the axially extending cuts.

Figure 9:
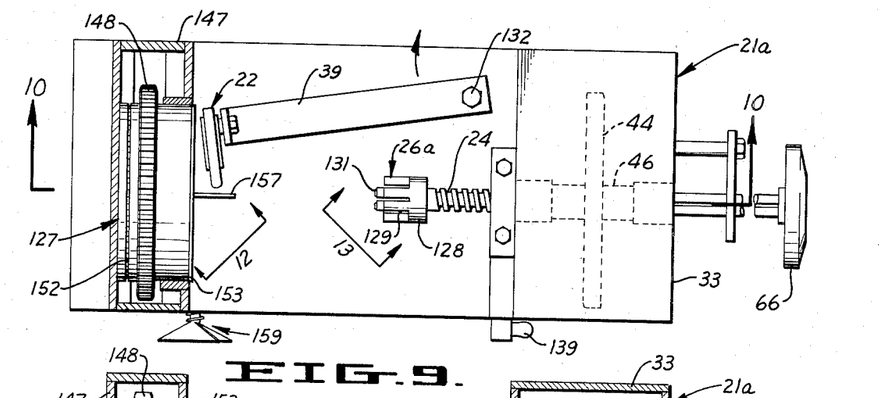
FIGURE 9, a top view of another form of the machine of this invention in which a cutter die is rotated to provide axially extending cuts on the potato as it is peeled.
Figure 10:
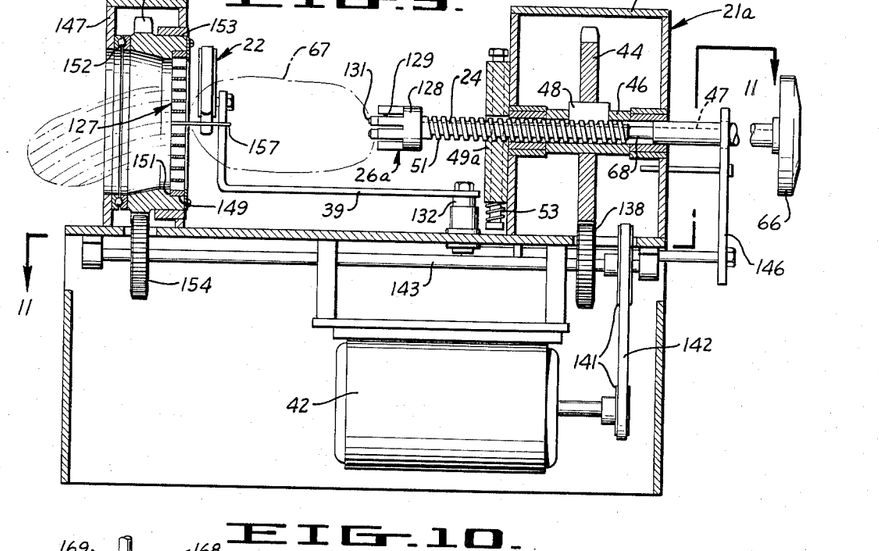
FIGURE 10, an elevational view of the embodiment shown in FIGURE 9, taken substantially in the plane of line 10—10 of FIGURE 9.
Figure 11:
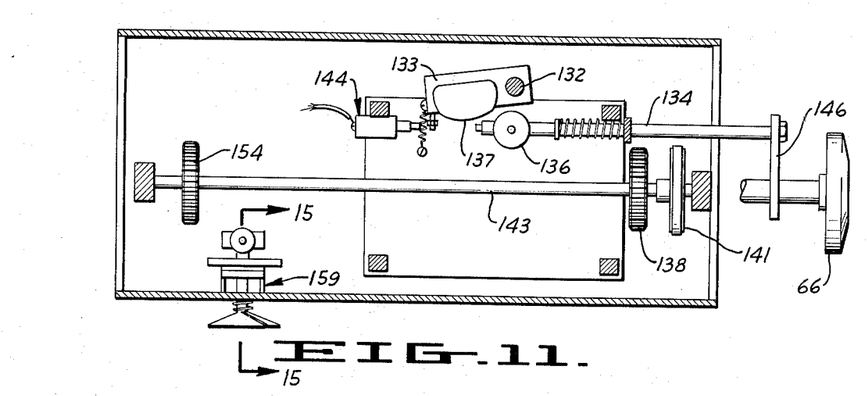
FIGURE 11, a view, partly in section, of the embodiment of the invention illustrated in FIGURE 9 taken substantially in the line 11—11 of FIGURE 10.

In the embodiment shown in FIGURES 9 through 11, the potato peeling machine 21a comprises a peeler head 22 carried on pivotal arm 39, a screw 24 having a chuck 26a at one end thereof, and means associated with the screw 24 carried in housing 33 for imparting rotational and axial movement to chuck 26a. All of these parts are similar to those shown and described in detail above relating to the embodiment of FIGURES 1 through 8 except the chuck 26a which is specifically constructed for cooperation with the cutter attachment 127 for providing axially extending cuts on the potato.

Figure 13:
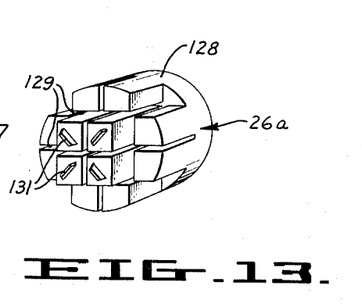
FIGURE 13, a perspective view of a chuck utilized in the embodiment of FIGURE 9 as seen from the line 13 thereof.

Thus the chuck 26a comprises a body 128 having recesses or grooves 129 therein adapted to allow the cutter 127 to telescope within the body of the chuck and force the entire potato through the cutter, and gripping lugs 131 for holding the potato, see FIGURE 13. The telescoping alignment of the chuck and cutter 127 is retained in all positions by virtue of the fact that rotation of both is synchronized. Rotation of the potato is initially effected by gripping lugs 131, but after the potato enters the cutter 127, the cutter also provides rotation to the potato.

The peeler head 22 is carried on arm 39 in a resilient manner as in the embodiment of FIGURES 1 through 7, but the means which protects the peeler head from contact with the chuck includes a mechanism for swinging the arm 39 outward. As best seen in FIGURES 9 and 11, arm 39 is mounted on a post 132 which carries a cam 133 fastened thereto so that movement of the cam causes corresponding movement of the arm. The arm is normally urged toward the axis of rotation of the potato by a spring (not shown) or equivalent means. When the chuck gets close to the peeler head, shaft 134 which moves axially therewith forces cam follower 136 against cam surface 137 whereby cam 133 rotates post 132 and arm 39 an amount sufficient to keep the peeler head clear of the chuck.

Rotation of the chuck is obtained from drive gear 138 through gear 44 and sleeve 46 which contains key 48 that slides in groove 47 extending along the length of the screw. In this way, rotation is transferred to screw 24 in the same manner as in the embodiment of FIGURES 1 through 7.

Similarly axial movement is imparted to the screw 24 by means of split nut 49a which is urged into engagement with threads 51 by compression spring 53. When the chuck reaches the finally desired position in telescoping engagement with cutter attachment 127, the split nut falls into cutaway 68 and axial movement of the chuck is halted.

Control of the split nut is effected by operation of handle 139 which contains a mechanism (not shown) to bring the split nut out of threaded engagement, as is accomplished in the embodiment described in detail relating to FIGURE 1. Power is supplied to drive gear 138 from motor 42 through drive pulleys 141, belt 142 and drive shaft 143. Suitable switches are provided to turn the motor 42 on and off, thus controlling rotation of the chuck and cutting attachment 127 which is in syncronized rotation thereto.

A suitable switch (not shown) may be provided in association with handle 139 to shut the motor off when the split nut is out of engagement with screw 24 and to turn it on when it is engaged. In order to stop rotation when the chuck has reached its limit of axial travel, a limit switch 144 is provided, see FIGURE 11. This limit switch is activated by shaft 134 which is held in fixed relation to screw 24 by arm 146 so as to move in a vector absolutely dependent upon the axial motion of the screw and associated chuck. With this arrangement, the limit switch 144 may be adjusted to accommodate different cutter attachments 127.

Cutter attachment 127 is suitably mounted in a frame or housing 147 which is carried at an appropriate position on the main housing 33 of the machine. Within the housing 147, there is provided a gear 148 being open at the center and having walls 149 adapted to hold cutter attachment 127 or the like together with shoulders 151 for holding the cutter attachment against axial movement within the gear. A thrust bearing 152 is also provided which is preferably a low friction bearing such as the ball bearing shown because the axial forces required to force the potato through a French fry cutter are extremely high and a low coefficient of friction is required to prevent excessive frictional forces. Thus gear 148 is journaled for rotation in frame 147 at 153 and rotated by drive gear 154 which is held on drive shaft 143.

The ratio of gear teeth on gear 148 with respect to gear 154 is the same as the ratio of gear teeth of gear 44 to drive gear 138. Thus synchronous rotation of the cutter attachment 127 and the chuck 26a is positively assured.

Figure 12:
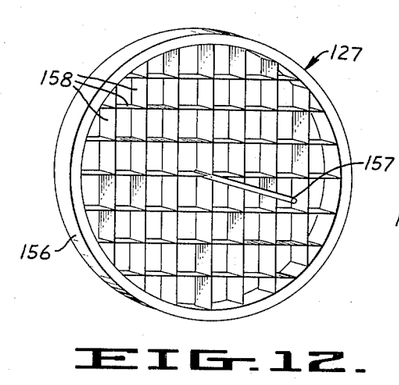
FIGURE 12, a perspective view of a cutter die particularly suitable for providing potatoes cut in a form for making French fried potatoes as the potato is peeled in the machine as seen from line 12 of FIGURE 9.

A typical cutter attachment 127 suitable for cutting the potatoes into a French fry form as the potato is pushed axially therethrough is shown in FIGURE 12. As here shown, the attachment comprises a circular frame 156, a spindle 157 adapted to grip and hold the potato at an axis thereof prior to entry of the potato through the cutter, and a group of cutter blades 158 within the housing.

In the form here shown, the cutter blades comprise a first group of blades disposed in substantially parallel planes and a second group of blades disposed in another series of parallel planes perpendicular to said first series of parallel planes. Preferably the distances between the blades are constant so that pieces of potato having a uniform square cross-section are obtained. Although the frame 156 is shown circular, it is seen that other forms could be used so long as the frame 156 conforms with wall 149 of gear 148. It is also important that the cutter is aligned with the chuck and held against slipping.

As indicated above, considerable thrust is required to force the potato through the cutter 127, and it is considered desirable to decrease this thrust, particularly when French fries of a small cross-section are desired because there is a limit to the amount of thrust that the potato itself will take without being crushed into pulp.

It has been found that the total of the resisting force obtained as the potato is cut by the cutting blade is not only caused by the work required to cut the potato but also the frictional forces which impede movement of the potato as it is forced between the parallel blades. These frictional forces are aggravated when the blade is sharp and the rearward walls thereof are relatively thick because the potato pieces are necessarily squeezed between the blades.

Figure 14:
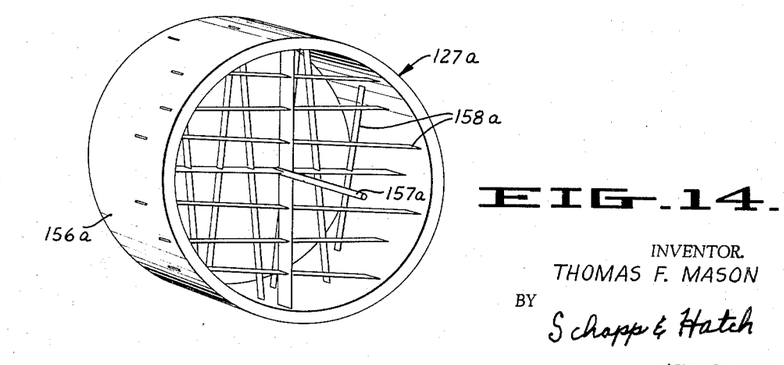
FIGURE 14, a perspective view of an alternative form of cutter die suitable for peeling the potatoes into French fry form.

In order to reduce the above mentioned frictional forces to a minimum and provide a cutter in which French fries having an exceptionally small cross-section may be obtained, the cutting blades are disposed in non-parallel positions as shown in cutter attachment 127a illustrated in FIGURE 14. As there shown, blades 158a are held within housing 156a, and the blades support a spindle 157a. All of these parts function in a manner equivalent to the corresponding parts described in the embodiment of FIGURE 12.

From the drawing, it is seen that the blades 158a may be divided into two groups, one of which lies in a series of equally spaced parallel planes and the other of which lies in another series of parallel planes perpendicularly disposed to said first set of blades. However, the blades themselves are skew with respect to each other and their cutting edges do not lie in the same plane as in the embodiment of FIGURE 12. Thus the cutting action of each individual blade occurs at different times, and not all of the cutting action from the same blade occurs at the same time. Although this alone provides a reduction of the axial force necessary to push the potato through the cutter, it is believed that most of the reduction is obtained by minimizing the adjacent blade surfaces between which the cut potato must squeezedly move.

Although I have illustrated two forms of cutters suitable for providing axial cuts which provide potatoes in a cut form suitable for elongated French fries or shoe-string potatoes, it is seen that by utilizing a smaller number of cutter blades other axially extending cuts may be provided. For example, spindle 157 could be held by a single radially disposed blade such as the blade 119 of FIGURE 6. In addition, a single blade extending diametrically across the cutter could be provided to cut the potato axially in half so as to provide potatoes which are simultaneously peeled and cut in half for boiling or the like. Alternatively, the potato may be quartered by utilizing a pair of diametrically disposed blades which are substantially perpendicular to each other. Obviously, other forms of blades may be incorporated including curved blades or blades adapted to provide wavy cuts on the potato.

From the foregoing description, it is seen that the embodiment shown in FIGURES 9 through 15 provides a simultaneous peeling and cutting operation with the cutting accomplished along the long dimensions of the potato. However, it is seen that the peeling knife does not peel the portion of potato which fits into the chuck and therefore this peel should be removed prior to inserting the potato on the chuck itself. If this is not done, the heel of the potato fitting against the chuck will be passed entirely through the machine and will still contain some undesired peel or eye. Accordingly, this peel is preferably removed by an attachment 159 which is illustrated in detail in FIGURE 15.

Figure 15:
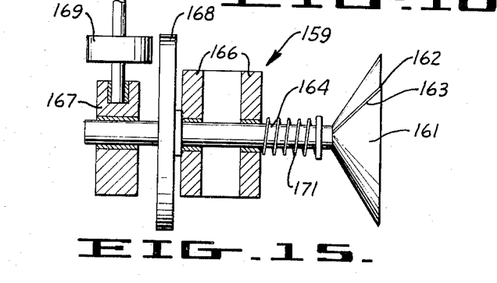
FIGURE 15, a cross-sectional view of an auxiliary cutter for removing the potato peeling from the heel end of the potato as seen in the plane of line 15—15 of FIGURE 11.

The attachment 159 comprises a substantially cone-shaped member 161 having a straight knife edge 162 adjacent to a slit 163 on the conic surface of the member. Means are also provided for rotating the member as a potato is positioned thereagainst by the operator so as to cut away the entire peel at the end of the potato.

These means comprise a shaft 164 journaled for rotation in flanges 166 and 167 with a drive wheel 168 at one end of the shaft and the cone-shaped member at the other end thereof. Drive wheel 168 is a friction disc adapted to receive rotation from a drive wheel 169 which in turn receives power from any suitable source. The contacting surfaces of said wheels operate by frictional engagement in a manner similar to a clutch.

Compression spring 171 normally urges the cone-shaped member out of driving relation by breaking contact between wheel 168 and wheel 169. However, when the operator pushes the potato against the cone-shaped member and forces it axially inward, driving contact is made and the cone-shaped member rotates to peel off the end of the potato by means of knife edge 162 with the peel passing through slit 163. This peeling operation is continued until the end of the potato is cleaned, i.e., until all of the eyes and rotten spots are removed.

In operation of the embodiment of the invention illustrated in FIGURES 9 through 15, the operator first peels an end of the potato as just described. He then inserts the peeled end of the potato onto the chuck 26a and forces the other end onto spindle 157 by moving handle 66 axially until the potato is positioned on the spindle and against the peeling head 22. Handle 139 is then turned to activate the motor and position split nut 49a onto the screw 24. The potato and cutter attachment are then rotated and the potato is moved axially through the cutter attachment by the action of the split nut on the screw 24.

At the same time the peeling head 22 is held resiliently on the outer surface of the potato in the manner described above and removes a continuous spiral peel, together with eyes and soft spots from the outer surface of the potato as it is rotated. When the chuck reaches the peeling head 22, the peeling head is positively forced backward an amount sufficient to clear the chuck by cam 133. The chuck is then moved in telescopic relation into the cutter attachment 127 so as to push the entire potato through the cutter.

When the chuck is telescoped to a certain point within the cutter attachment, the split nut which causes axial drive of the chuck falls into the cutaway in the screw and axial movement ceases. At the same time, shaft 134 contacts the limit switch 144 to shut off the power and halt rotation of the chuck and cutter attachment.

Handle 139 is then rotated to release the split nut from the cutaway and shut off the motor. Then the screw and chuck are pulled axially backwards by the operator by movement of handle 66. The machine is then in position for another cycle of operation whereby another potato may be simultaneously peeled and cut.

From the foregoing description, it is seen that potatoes may be simultaneously peeled and cut into any of a variety of shapes with the machine. It is also seen that the operation may be accomplished quickly and efficiently, and that the machine is particularly suitable for the rapid preparation of small orders such as are needed in restaurants and the like.

I claim:
1. In a potato peeling machine comprising a chuck for holding a potato at one end, a spindle for holding the potato at the other end thereof in alignment with said chuck for rotation of the potato about a central axis, and a peeler head resiliently held in cutting position against the surface of the potato and adapted to cut into the potato during rotational and axial movement thereof to remove a peel in spiral fashion, in combination, drive means for driving the chuck in rotational and axial movement whereby the potato is moved rotationally and axially, including a housing, a shaft mounted for rotation and axial movement through the housing and carrying the chuck on one end thereof, said shaft containing a screw thread over a substantial portion of the length thereof, a groove serving as an elongated keyway extending axially along the shaft through said threads, a recessed portion in said threads at the end thereof opposite to the chuck end of the shaft, a drive gear having a central sleeve mounted on said shaft over said threads, said drive gear having a key internally mounted in the central sleeve for driving the shaft when the key is in the groove and slipping with relation to the shaft when the key is at the recessed portion, a split nut mounted on the housing for removable engagement with the threads on the shaft whereby engagement of the nut and rotation of the shaft causes axial movement of the shaft with respect to the housing, and power means for driving the drive gear.

2. The potato peeling machine defined in claim 1, in which the peeler head contains a peeling knife resiliently held in a radial direction to the potato and has means associated therewith for directing the peel outwardly from the potato and away from the machine.

3. The potato peeling machine defined in claim 2, in which the means for directing the peel outwardly from the potato also contains a recess to prevent clogging thereof at the beginning of the peeling operation when the knife is peeling at the end of the potato.

4. The potato peeling machine defined in claim 1, in which there is also provided a cutting blade held in a position substantially perpendicular to the spindle for providing a cut on the potato along a radius perpendicular to its axis of rotation.

5. The potato peeling machine defined in claim 4, in which there is also provided an ejector on the chuck for ejecting the heel of the potato remaining thereon after the cutting operation is completed, said ejector having means for automatically resetting the ejector in a normal operative position after said ejection takes place.

6. The potato peeling machine defined in claim 4, in which there is also provided a self-unloading collecting tin associated with the cutting blade for receiving potatoes after cutting and peeling thereof.

7. The potato peeling machine defined in claim 4, in which the cutting blade contains a series of cutting units perpendicularly disposed to the cutting blade for providing concentric circular cuts on the potato being cut.

8. The potato peeling machine defined in claim 4, in which the spindle is mounted for rotation and contains means for imparting the rotation of the potato to the spindle, and a cutter carried on the other end of the spindle whereby the cutter rotates in synchronous fashion with the potato and provides axial cuts thereon.

9. The potato peeling machine defined in claim 8, in which the cutter carries a blade adapted to make a radial cut through the length of the potato.

10. The potato peeling machine defined in claim 8, in which the cutter contains a pair of perpendicularly-disposed blades for cutting the potato rings into quarters.

11. The potato peeling machine defined in claim 8, in which the cutter contains a plurality of blades disposed substantially parallel to each other for providing substantially parallel longitudinal cuts onto the potato and co-operating with the cutting blade to provide pieces of potato in substantially shoestring form.

12. In a potato peeling machine comprising a chuck for holding a potato at one end, a spindle for holding the potato at the other end thereof in alignment with said chuck for rotation of the potato about a central axis, and a peeler head resiliently held in cutting position against the surface of the potato and adapted to cut into the potato during rotational and axial movement thereof to remove a peel in spiral fashion, in combination, drive means for driving the chuck in rotational and axial movement whereby the potato is moved rotationally and axially, including a housing, a shaft mounted for rotation and axial movement through the housing and carrying the chuck on one end thereof, said shaft containing a screw thread over a substantial portion of the length thereof, a groove serving as an elongated keyway extending axially along the shaft through said threads, a recessed portion in said threads at the end thereof opposite to the chuck end of the shaft, a drive gear having a central sleeve mounted on said shaft over said threads, said drive gear having a key internally mounted in the central sleeve for driving the shaft when the key is in the groove and slipping with relation to the shaft when the key is at the recessed portion, a split nut mounted on the housing for removable engagement with the threads on the shaft whereby engagement of the nut and rotation of the shaft causes axial movement of the shaft with respect to the housing, and power means for driving the drive gear, said potato peeling machine also containing a cutter adapted to receive the axially moving potato from the chuck and effect longitudinal cuts therethrough, drive means associated with said cutter and synchronized with the drive means for said chuck to provide a positive drive on the cutter synchronized with the drive of the chuck, said cutter having a first set of blades lying in a plurality of parallel planes so as to cut the potato into parallel slabs and a second set of blades lying in a plurality of planes which are perpendicular to the planes in which said first set of blades lie for cutting the potatoes into a plurality of slabs perpendicularly disposed to the first-mentioned set of slabs whereby axially extending potatoes of substantially rectangular cross-section are provided.

13. The potato peeling machine defined in claim 12, in which the first set of blades of the cutter have cutting edges which define non-parallel lines, and in which the second set of blades also contain cutting edges which define non-parallel lines.

14. The potato peeling machine defined in claim 12, in which said peeler head contains a cutting element for peeling having means associated therewith for directing the peel outwardly from the potato and away from the machine.

15. The potato peeling machine defined in claim 12, in which said peeler head contains a cutting element for peeling having means associated therewith for directing the peel outwardly from the potato and away from the machine, and said means for directing the peel outwardly from the potato containing a recess to prevent clogging thereof at the beginning of the peeling operation when the cutting element is peeling at the end of the potato.

References Cited by the Examiner

UNITED STATES PATENTS

| | | | |
|---|---|---|---|
| 29,988 | 9/60 | Parker | 146—35 X |
| 597,487 | 1/98 | Lloyd | 146—33 |
| 2,012,507 | 8/35 | Gustin | 146—166 |
| 2,521,987 | 9/50 | Mason | 146—166 X |
| 2,489,581 | 11/49 | Mason | 146—166 |
| 2,693,210 | 11/54 | Gustafson | 146—43 X |
| 3,091,269 | 5/63 | Burns et al. | |

FOREIGN PATENTS 21,138    1893    Great Britain.

J. SPENCER OVERHOLSER, *Primary Examiner.*

CARL W. ROBINSON, *Examiner.*